United States Patent Office 3,397,255
Patented Aug. 13, 1968

3,397,255
ALKYD RESINS PREPARED BY SIMULTANEOUS-
LY REACTING (1) A POLYCARBOXYLIC ACID (2)
A POLYHYDRIC ALCOHOL HAVING AT LEAST
3 HYDROXYL GROUPS AND (3) A MONOEPOXY-
ALKANE HAVING 8-26 CARBON ATOMS
Carlton E. Coats and Richard B. Graver, Savage, and
Stephen F. Hudak, Minneapolis, Minn., assignors, by
mesne assignments, to Ashland Oil and Refining Company, a corporation of Kentucky
No Drawing. Filed Dec. 29, 1964, Ser. No. 421,991
9 Claims. (Cl. 260—850)

ABSTRACT OF THE DISCLOSURE

Alkyd resins are obtained by the reaction of 15–60% by weight of the total resin components of a polycarboxylic acid, 10–45% by weight of the total resin components of a polyhydric alcohol, and 10–70% by weight of the total resin components of an epoxide containing component consisting essentially of an epoxy-alkane containing 8–26 carbon atoms.

---

This invention relates to novel alkyd resins and more particularly to alkyd resins of increased chemical resistance and improved flexibility and toughness.

It is the principal object of the present invention to provide novel alkyd resin formulations of improved chemical resistance and mechanical properties which are particularly useful as baking enamels.

In accordance with the present invention it was discovered that alkyd resins obtained by the reaction of a polycarboxylic acid, a polyhydric alcohol and an epoxide component consisting essentially of an epoxy-alkane give rise to surprisingly improved alkyd resin particularly when employed as resin vehicles in baking enamels. The resins of the present invention are formed by combining 15 to 60 percent by weight of the total composition of a polycarboxylic acid, and 10 to 45 percent by weight of the total composition of a polyhydric alcohol with 10 to 70 percent by weight of the total composition of an epoxy-alkane.

The polycarboxylic acids, by which is meant carboxylic acids containing generally from two to four carboxylic acid groups, can be used as such or in the form of their anhydrides. As used herein, the term polycarboxylic acid is meant to include both anhydrides and acids. The polycarboxylic acid may be aliphatic, cycloaliphatic or aromatic in nature. The polycarboxylic acids generally employed in the formation of alkyd resins are well known and are suitable in the formation of the resins of the present invention. Specific examples of such acids are phthalic anhydride, phthalic acid, dihydrophthalic acid, tetrahydrophthalic acid, isophthalic acid, terephthalic acid, succinic acid, alkyl succinic acid, adipic acid, sebacic acid, maleic acid, maleic anhydride, fumaric acid, Diels-Alder adducts of maleic acid with dienes, trimellitic acid, pyromellitic acid and aconitic acid. More than one polycarboxylic acid can be employed.

In addition to the aforesaid polycarboxylic acids monocarboxylic acids free of ethylenic unsaturation can be added to the resin formulations to lower the viscosity of the alkyd resin and to increase its thermoplasticity. The use of such acids, which exclude the fatty acids, is known in the art. Examples of such acids are pelargonic acid, cyclohexane carboxylic acid, benzoic acid, or tertiary butyl benzoic acid.

The polyhydric alcohols employed in the formation of the alkyd resins of the present invention contain at least two hydroxyl groups although it is preferred to employ at least in part, polyhydric alcohols containing three to six hydroxyl groups. In general, the number of carbon atoms of the polyhydric alcohol is not greater than eight carbon atoms. The polyhydric alcohols employed in the formation of the herein described alkyd resins are those heretofore employed in the formation of alkyd resins and include in particular glycerol, trimethylolethane, trimethylolpropane, 1,2,6-hexanetriol, diglycerol, pentaerythritol, and dipentaerythritol. More than one polyhydric alcohol can be employed and such is generally preferred where a dihydric alcohol such as ethylene glycol, propylene glycol, hydrogenated bisphenol A, or diethylene glycol is employed.

The epoxy-alkanes employed in the process of the present invention are the epoxides of monoolefins having from 8 to 26 carbon atoms. It is not essential that the olefin epoxidized be of uniform composition and it is possible to employ a mixture of olefins in which the carbon number varies significantly. Olefins having the required number of carbon atoms are obtained by the polymerization of ethylene with aluminum alkyls or through cracking of petroleum. The unsaturation in the olefin can be terminal or internal and the olefin can be straight chain or branched. The epoxidation of the olefin is carried out by reaction with in situ-formed peracetic acid by methods well known in the art. Specific examples of the epoxy-alkanes include 1,2-epoxy-dodecane, 1,2-epoxy-octadecane, 1,2-epoxy-pentadecane, 3,4-epoxy-dodecane and similar epoxy alkanes. It is not necessary that the epoxy-alkane be employed in pure form. A commercially available $C_{15}$ to $C_{20}$ epoxy-alkane useful in the formation of the novel alkyd resins of the present invention can contain for example 85 percent of the epoxide with the remainder being olefins and saturated hydrocarbons the molecular weight distribution of the epoxy-alkane being:

| | Percent |
|---|---|
| 1,2-epoxy-tetradecane | 1 |
| 1,2-epoxy-pentadecane | 12 |
| 1,2-epoxy-hexadecane | 19 |
| 1,2-epoxy-heptadecane | 18 |
| 1,2-epoxy-octadecane | 18 |
| 1,2-epoxy-nonadecane | 19 |
| 1,2-epoxy-eicosane | 14 |
| 1,2-epoxy-heneicosane | 1 |

The ratio in which the three principal components of the alkyd resins of the present invention are employed can be varied widely within the limits hereinabove set forth.

The alkyd resins are generally formed by reacting the components at a temperature of 130° C. to 270° C. The components of the alkyd resin may be admixed in any suitable order at atmospheric pressure. An organic solvent and particularly an aromatic aliphatic or halogenated hydrocarbon such as xylene can be added to the reaction mixture to remove by azeotropic reflux water formed during the reaction. Other suitable solvents including benzene, toluene, mineral spirits and the like. The quantity of solvent can vary and usually is in the range of 3 to 12 weight percent based on resin. To avoid undesirable color formation, it is generally preferred to carry out the reaction in the absence of oxygen.

The reaction is continued until the desired degree of polymerization is obtained as measured by the acid number of the resin (the milliequivalents of potassium hydroxide required to neutralize the acid in one gram of resin) or as measured by the viscosity of the resin in solution. The resulting resin may then be further diluted with solvent to obtain the desired concentration for the intended application. In a typical application the resin solution can have a viscosity of 15 stokes and a nonvolatile content in xylene of 60 percent.

In general, when employed as resin vehicles in baking enamels, the alkyd resins of the present invention are admixed with an amine formaldehyde resin, such as a urea formaldehyde or melamine formaldehyde resin or a benzoquinone aldehyde resin which acts as the crosslinking and curing agent. The curing agent is usually employed in a concentration of 10 to 40 percent by weight of the alkyd resin. In the formulation of baking enamels it is customary to add pigments, dyes, or tints such as titanium dioxide, zinc oxide, phthalocyanine, malachite green, aluminum powder and the like. The resin vehicles of the present invention can be combined with such coloring agents and similar additives in accordance with prior art methods.

If desired, catalysts employed in esterification reactions may also be employed to accelerate the formation of the novel alkyd resins. Such catalysts include sulfuric acid, benzene sulfonic acid, p-toluene sulfonic acid or the chloride of magnesium, aluminum or zinc. Very useful catalysts are also solid insoluble materials with acidic properties, such as ion exchange resins. The concentration of the catalyst is generally maintained within the range of 0.1 to 10 percent by weight of the reaction components unless otherwise noted, all units of quantity are by weight.

The invention is further illustrated by the following examples which are not to be considered as limitative of the invention. Unless otherwise noted all units of quantity are by weight.

Example 1

Into a three-necked flask equipped with a Dean-Stark water trap, condenser, agitator, thermometer and inert gas inlet was charged under a blanket of nitrogen in the order indicated:

| | Parts |
|---|---|
| (a) $C_{11}$–$C_{15}$ linear alpha-olefin epoxide | 36.10 |
| (b) p-Tert-butyl benzoic acid | 15.50 |
| (c) Adipic acid | 4.08 |
| (d) Phthalic anhydride | 30.80 |
| (e) Pentaerythritol | 18.55 |

The mixture was heated to 420 to 430° F. and 5% of xylene added to facilitate the removal of water by azeotropic distillation. The reaction was continued until an acid number of 10 to 15 was obtained. The resulting resin composition was cooled and then diluted to 60% of nonvolatiles by the addition of 67 parts xylene. The resulting resin solution had a viscosity of 26.0 stokes and an acid number of 12.5.

Example 2

Employing the procedure of Example 1 the following resin components were charged to the reaction flask in the order indicated:

| | Parts |
|---|---|
| (a) $C_{12}$ linear alpha-olefin epoxide | 45.80 |
| (b) Phthalic acid | 38.00 |
| (c) Adipic acid | 5.17 |
| (d) Glycerol | 14.30 |

The resulting diluted resin was determined to have an acid number of 10.5 and a viscosity of 17.2 stokes at a 60% non-volatile content in xylene.

An enamel composition was prepared from the resin of Example 1 by admixing 100 parts of the resin with 200 parts of rutile $TiO_2$, 35 parts of xylene and 25 parts of butanol. The mixture was ground for 16 to 24 hours on a pebble mill. To the mixture was then added another 197 parts of the resin of Example 1, 125 parts of a triazine formaldehyde resin solution commercially available as "MX61" containing 60% of resin and 43 parts of xylene. Grinding was continued until a uniform composition was obtained. The resulting composition was coated on cleaned steel panels to give 3.0 mil wet films which were then baked at 250° F. for 30 minutes. The resulting coatings showed significantly better stain resistance as compared to conventional alkyd resin coatings obtained from hydrogenated cocoanut fatty acid, phthalic anhydride and trimethylolethane produced under the same conditions as well as better Sward hardness, adhesion and mar resistance.

From the foregoing discussion of the physical properties of the cured resin it will be apparent that the principal utility of the alkyd resins of the present invention is as baking enamels in which the alkyd resins are cured by the use of resinous curing agents such as urea formaldehyde, melamine formaldehyde and similar amine aldehyde resins. The resins of the present invention can, however, be broadly used in other paint, varnish, or lacquer formulations.

The examples hereinabove set forth have described specific means for preparing the alkyd resins of the present invention. In view of the well-known equivalency of other polycarboxylic acids and polyhydric alcohols, encompassed within the scope of the invention described, with those of the examples in the preparation of alkyd resin, it will be apparent that the specific methods illustrated in the examples are applicable to other polycarboxylic acids and polyhydric alcohols hereinabove set forth.

It will be recognized that many modifications and variations of the foregoing improvements in alkyd resins as coating and laminating vehicles can be made without departing from the spirit and scope of the present invention and it is intended to include such in the invention as described hereinabove and as defined in the appended claims.

What is claimed is:

1. An alkyd resin obtained by the simultaneous reaction of 15 to 60% by weight of the total resin components of a polycarboxylic acid, 10 to 45% by weight of the total resin components of a polyhydric alcohol, having from 3 to 6 hydroxyl groups and 10 to 70% by weight of the total resin components of an epoxide containing component consisting essentially of a monoepoxy-alkane containing from 8 to 26 carbon atoms.

2. The alkyd resin of claim 1 wherein the epoxide is the epoxide of an alpha-olefin.

3. The alkyd resin of claim 1 wherein polyhydric alcohol is pentaerythritol.

4. The alkyd resin of claim 1 wherein the polycarboxylic acid is phthalic anhydride.

5. The alkyd resin of claim 1 wherein the polyhydric alcohol is glycerol.

6. The alkyd resin of claim 1 wherein the polycarboxylic acid is phthalic acid, terephthalic acid, adipic acid, fumaric acid, maleic acid or anhydrides thereof and the polyhydric alcohol is glycerol, trimethylolpropane, triethylolpropane or pentaerythritol.

7. An alkyd resin obtained by the simultaneous reaction of 15 to 60% by weight of the total resin components of phthalic anhydride, 10 to 45% by weight of the total resin components of pentaerythritol, and 10 to 70% by weight of the total resin components of an epoxide containing component consisting essentially of a monoepoxy-alkane of 8 to 26 carbon atoms.

8. The alkyd resin of claim 7 wherein the mono-epoxy-alkane is 1,2-epoxy-dodecane.

9. The cured alkyd resin of claim 1 obtained by reaction of the alkyd resin with an amine aldehyde resin.

(References on following page)

References Cited

UNITED STATES PATENTS

| | | | |
|---|---|---|---|
| 2,720,050 | 10/1955 | Cody | 260—75 |
| 3,065,199 | 11/1962 | Collardeau et al. | 260—75 |
| 3,161,618 | 12/1964 | Kreps et al. | 260—75 |
| 3,249,615 | 5/1966 | Ackermann | 260—861 |
| 3,264,267 | 8/1966 | Stephens et al. | 260—75 |

FOREIGN PATENTS 569,634   1/1959   Canada.

OTHER REFERENCES

Organic Coating Technology, vol. I, Payne, Wiley, N.Y. 1954, TP G35 P38, p. 269.

MURRAY TILLMAN, *Primary Examiner.*

J. C. BLEUTGE, *Assistant Examiner.*